United States Patent
Meng et al.

(10) Patent No.: US 12,303,866 B1
(45) Date of Patent: May 20, 2025

(54) CARBON FIXATION MATERIAL FOR ADSORBING HEAVY METALS IN SOIL AND PREPARATION METHOD THEREOF

(71) Applicants: Shanghai Normal University, Shanghai (CN); Shangdong Nonghuanlvpin Environmental Co. Ltd, Linyi (CN)

(72) Inventors: Liang Meng, Shanghai (CN); Qishi Luo, Shanghai (CN); Xiwei Liu, Linyi (CN); Xin Gao, Linyi (CN); Huishu Zhuang, Linyi (CN); Huarui Nie, Shanghai (CN); Haitao Yin, Shanghai (CN); Li Li, Shanghai (CN); Jiamu Xiao, Shanghai (CN); Haibo Gao, Shanghai (CN)

(73) Assignees: Shanghai Normal University, Shanghai (CN); Shangdong Nonghuanlvpin Environmental Co. Ltd, Linyi (CN)

( * ) Notice: Subject to any disclaimer, the term of this patent is extended or adjusted under 35 U.S.C. 154(b) by 0 days.

(21) Appl. No.: 18/945,435

(22) Filed: Nov. 12, 2024

(30) Foreign Application Priority Data

Feb. 27, 2024 (CN) .......................... 202410214117.3

(51) Int. Cl.
*B01J 20/24* (2006.01)
*B01J 20/30* (2006.01)
*B09C 1/08* (2006.01)
*C01B 32/05* (2017.01)

(52) U.S. Cl.
CPC ........... *B01J 20/24* (2013.01); *B01J 20/3021* (2013.01); *B01J 20/3071* (2013.01); *B01J 20/3078* (2013.01); *B01J 20/3085* (2013.01); *B09C 1/08* (2013.01); *C01B 32/05* (2017.08)

(58) Field of Classification Search
USPC .......................................................... 502/5
See application file for complete search history.

(56) References Cited

U.S. PATENT DOCUMENTS

| 2012/0240457 | A1* | 9/2012 | Koukios | ................ C10L 9/083 44/605 |
| 2022/0039379 | A1* | 2/2022 | Dujardin | ................. A01P 1/00 |

FOREIGN PATENT DOCUMENTS

| CN | 114394867 | A |   | 4/2022 |          |
| CN | 115069214 | A | * | 9/2022 |          |
| CN | 115074136 | A | * | 9/2022 |          |
| CN | 115109596 | A | * | 9/2022 | ............... B09C 1/00 |
| CN | 115369486 | B | * | 4/2023 |          |

OTHER PUBLICATIONS

English translation of CN-115369486-B Description. (Year: 2023).*
English translation of CN-115069214-A Description. (Year: 2022).*
English translation of CN-115074136-A Description. (Year: 2022).*
English translation of CN-115109596-A Description. (Year: 2022).*
English translation of CN-114394867-A Description. (Year: 2022).*
Chen Xinjie et al., "Comparison of the cadmium adsorption characteristics of three types of new modified corn straw biochars", "Journal of Anhui Agricultural University", Dec. 18, 2023, pp. 1006-1012, issue 6, vol. 50.

* cited by examiner

*Primary Examiner* — Anthony J Zimmer
*Assistant Examiner* — Zachary John Baum

(57) ABSTRACT

A carbon fixation material for adsorbing heavy metals in soil and a preparation method thereof are provided. The carbon fixation material includes modified biochar, calcium silicate, aluminum sulfate, hydroxymethyl cellulose and urea. The modified biochar is prepared by preparing biochar from agricultural and forestry waste, and modifying the biochar with ferric chloride and a mercapto silane coupling agent. The carbon fixation material has excellent carbon fixation capacity, the biochar is prepared by processing agricultural and forestry waste, the material source is green and environmentally friendly, can reduce environmental pollution. After modified by ferric chloride and mercapto silane coupling agent, the biochar has excellent adsorption amount and adsorption capacity for heavy metal ions and has strong retention capacity after adsorption, the modified biochar can be widely used in soil carbon fixation and heavy metal pollution treatment.

5 Claims, No Drawings

CARBON FIXATION MATERIAL FOR ADSORBING HEAVY METALS IN SOIL AND PREPARATION METHOD THEREOF

CROSS-REFERENCE TO RELATED APPLICATION

This application claims priority to Chinese Patent Application No. 202410214117.3, filed on Jul. 23, 2024, which is herein incorporated by reference in its entirety.

TECHNICAL FIELD

The disclosure relates to the technical field of agricultural field additives, and more particularly to a carbon fixation material for adsorbing heavy metals in soil and a preparation method thereof.

BACKGROUND

Carbon in soil is an important element that plants rely on for growth. In addition to carbon dioxide ($CO_2$) in air, the carbon required for plant growth also includes organic carbon and inorganic carbon in the soil. The soil releases a large amount of carbon dioxide into the atmosphere each year. The amount of the carbon dioxide released from the soil each year far exceeds the carbon dioxide emitted into the atmosphere by burning of fossil fuels each year. Therefore, carbon fixation in agricultural soils is beneficial to crop production and can also alleviate pressure caused by high concentrations of carbon dioxide in the atmosphere.

Meanwhile, with a continuous advancement of industrialization, a discharge of industrial wastewater is also increasing year by year. Some heavy metal ions enter the water system with the discharge of industrial wastewater. An existing process of a sewage treatment plant cannot effectively remove the heavy metal ions remained in the wastewater, which increases a risk of the heavy metal ions entering the soil through reinjection of recycled water.

Since the heavy metals in the soil cannot be degraded by microorganisms, accumulation of the heavy metals in the plants seriously affects physiological and molecular activities of the plants, directly or indirectly slows down the plant growth and causes crop yield reduction. Accumulation of the heavy metals in the food chain also causes irreversible damage to a human body. Therefore, it is necessary to treat the heavy metal ions in the soil to reduce the harm to the environment and human health. In recent years, biochar has been considered as a promising heavy metal adsorbent due to its low cost, high specific surface area, high carbon content and rich functional groups.

The biochar is a type of insoluble, stable, highly aromatic, carbon-rich solid produced by slow pyrolysis of biological residues at high temperatures in the absence of oxygen. The biochar has a large specific surface area and strong ion exchange capacity, and can effectively adsorb the heavy metals and organic pollutants in the environment. The biochar has obvious advantages and huge application potential in the fields of environmental protection and agriculture, and has become one of the current research hotspots.

With a rapid development of agricultural intensification in China, a large amount of agricultural solid waste is generated. According to incomplete statistics, there are more than 750 million tons of crop straws each year. Due to great changes in the current planting structure and the energy structure in rural areas, a large amount of agricultural waste is abandoned or incinerated, which not only causes waste of resources, but also leads to environmental pollution.

Therefore, it is extremely important to use the agricultural solid waste to prepare a new soil carbon fixation material and apply the new soil carbon fixation material to treat heavy metal pollution in the soil, so as to achieve harmlessness and resource utilization of the agricultural solid waste, and achieve purposes of reducing environmental pressure and improving the ecological environment. Meanwhile, a carbon fixation capacity of carbon fixation materials in the related art is insufficient, the adsorption amount and adsorption capacity of the heavy metal ions in the soil need to be improved, and the carbon fixation materials in the related art have poor long-term stability, and poor retention after adsorption.

Therefore, there is an urgent need for a carbon fixation material that can recycle agricultural and forestry waste, has a certain carbon fixation capacity, has excellent adsorption amount and adsorption capacity for the heavy metal ions, and has strong retention capacity after adsorption.

SUMMARY

Aiming at defects of the related art, a purpose of the disclosure is to provide a carbon fixation material and a preparation method thereof, and the carbon fixation material can recycle agricultural and forestry waste, has a certain carbon fixation capacity, has excellent adsorption amount and adsorption capacity for heavy metal ions, and has strong retention capacity after adsorption.

On the one hand, the disclosure provides a carbon fixation material for adsorbing heavy metals in soil, including the following materials in parts by weight:

40-50 parts of modified biochar, 10-15 parts of calcium silicate, 5-8 parts of aluminum sulfate, 1-3 parts of hydroxymethyl cellulose and 3-5 parts of urea.

The modified biochar is prepared by preparing biochar from agricultural and forestry waste, and modifying the biochar with ferric chloride and a mercapto silane coupling agent.

The mercapto silane coupling agent includes a structure represented by a formula A expressed as follows:

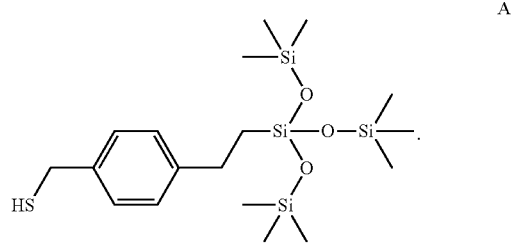 [SMILES: C[Si](C)(C)O[Si](CCc1ccc(CS)cc1)(O[Si](C)(C)C)O[Si](C)(C)C]

In the disclosure, the modified biochar, the calcium silicate, the aluminum sulfate, the hydroxymethyl cellulose and the urea are compounded to prepare the carbon fixation material for adsorbing heavy metals in soil. A gelatinous substance formed by the calcium silicate and the aluminum sulfate can form an agglomerate with the soil, and the agglomerate has extreme adsorption capacity, and can improve carbon capture capacity of the soil. The hydroxymethyl cellulose and the urea can form a film to fix the captured carbon in the soil, to thereby achieve the carbon fixation effect of the soil.

In an embodiment, the mercapto silane coupling agent is prepared by the following steps:

adding thiourea and chloromethylphenethyltris(trimethylsiloxy)silane ($C_{18}H_{37}ClO_3Si_4$) into a first reactor to obtain a first mixture, heating the first mixture to a temperature range of 160 Celsius degrees (° C.) to 180° C. to obtain a heated mixture, performing reflux reaction on the heated mixture for 6-8 hours (h) to obtain a refluxed mixture, cooling the refluxed mixture to a temperature range of 80° C. to 90° C., and continuously introducing ammonia gas into the first reactor until no reaction occurs to obtain a first reacted mixture, filtering the first reacted mixture to obtain a filtrate, decompressing and distilling the filtrate to obtain a fraction at a temperature range of 190° C. to 200° C.; where the fraction at the temperature range of 190° C. to 200° C. is the mercapto silane coupling agent.

In the disclosure, a thiolation reaction the is performed on chloromethylphenethyltris(trimethylsiloxy)silane to obtain the mercapto silane coupling agent. The sulfhydryl in the mercapto silane coupling agent reacts with the pretreated biochar, so that the mercapto silane coupling agent is successfully grafted into the biochar structure. The prepared mercapto silane coupling agent is non-toxic and harmless, and is grafted into the biochar structure. On the one hand, a large amount of silicon oxygen structures and silane structures in the mercapto silane coupling agent have good adsorption capacity for the heavy metal ions, which can further improve the adsorption capacity of the biochar for the heavy metal ions. On the other hand, a stable spatial structure of benzene ring and multi-branched chain of the mercapto silane coupling agent has excellent stability, which can improve the retention capacity of the biochar after adsorbing the heavy metals, thereby improving the treatment effect of the heavy metal ions.

In an embodiment, a weight ratio of the thiourea to chloromethylphenethyltris(trimethylsiloxy)silane is 1:4-6.

In an embodiment, the agricultural and forestry waste is at least one selected from the group consisting of corn stalks, rice husks, barks and leaves.

In the disclosure, the biochar is prepared by processing the agricultural and forestry waste, so as to achieve reuse of the wastes, and reduce environmental pollution and resource wastes. The biochar is further pretreated with the ferric chloride and acid, on the one hand, a large amount of micropores may appear on a surface of the biochar, which effectively increase a specific surface of the biochar, thereby enhancing the adsorption amount and adsorption capacity of the biochar; on the other hand, the biochar can be loaded with iron elements, and the adsorption capacity of the biochar for the heavy metal ions is further improved through an ion exchange effect of the iron elements.

On the other hand, the disclosure provides a preparation method of the carbon fixation material for adsorbing heavy metals in soil, including:

step 1, processing the agricultural and forestry wastes to obtain the biochar;

step 2, pretreating the biochar with the ferric chloride to obtain pretreated biochar;

step 3, reacting the mercapto silane coupling agent with the pretreated biochar to obtain the modified biochar; and step 4, mixing the modified biochar, the calcium silicate, the aluminum sulfate, the hydroxymethyl cellulose and the urea evenly in proportion to obtain the carbon fixation material for adsorbing heavy metals in soil.

In an embodiment, a specific method of the step 1 includes: washing the agricultural and forestry waste with distilled water to remove impurity to obtain washed waste, pyrolyzing the washed waste at a temperature range of 450° C. to 500° C. in a closed environment for 2-3 h to obtain pyrolyzed waste, and grinding the pyrolyzed waste until a particle size of the pyrolyzed waste is smaller than 1.5 millimeters (mm), to thereby obtain the biochar.

In an embodiment, a specific method of the step 2 includes: adding the biochar into a ferric chloride solution for ultrasonicating for 30-50 minutes (min) to obtain a second mixture, adjusting a power of hydrogen (pH) of the second mixture to 2-3, stirring the second mixture with the pH of 2-3 for 2-4 h, followed by filtering, washing and drying to obtain the pretreated biochar.

In an embodiment, in the step 2, a weight ratio of the biochar to the ferric chloride is 1-2:1; and a concentration of the ferric chloride solution is in a range of 0.1 molar per liter (mol/L) to 0.3 mol/L.

In an embodiment, a specific method of the step 3 includes: adding the pretreated biochar, the mercapto silane coupling agent, ethanol and deionized water into a second reactor to obtain a third mixture, stirring the third mixture to react for 6-8 h to obtain a second reacted mixture, adjusting a pH of the second reacted mixture to 7-9, continuously stirring the second reacted mixture to react for 6-8 h, followed by filtering, washing, drying to obtain a solid mixture, and grinding the solid mixture until a particle size of the solid mixture is smaller than 1.5 mm, to thereby obtain the modified biochar.

In order to make the reaction processes of the steps 2 and 3 more clear, the disclosure further provides specific chemical equations of the pretreated biochar and the modified biochar. Specifically, the specific chemical equation of the pretreated biochar is as follows:

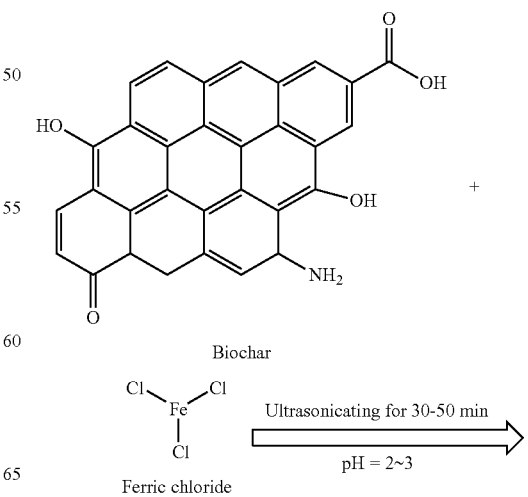

-continued

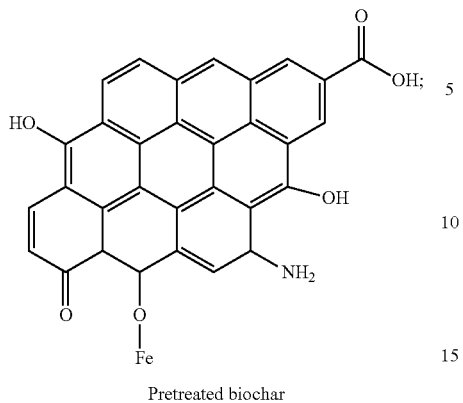

Pretreated biochar the specific chemical equation of the modified biochar is as follows:

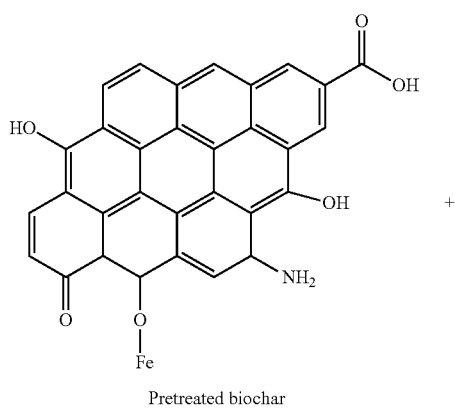

Pretreated biochar

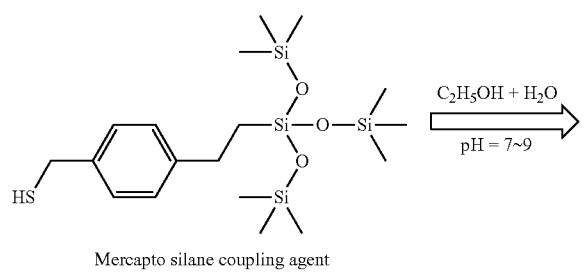

Mercapto silane coupling agent

-continued

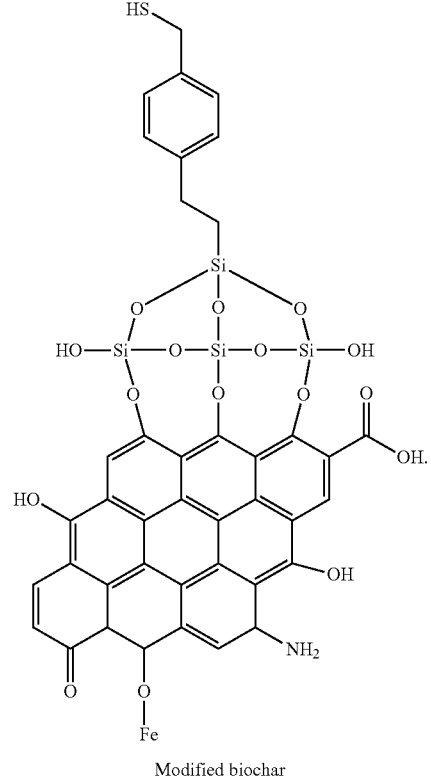

Modified biochar

In an embodiment, in the step 3, a weight ratio of the pretreated biochar:the mercapto silane coupling agent:the ethanol:the deionized water is (3-5):(1-2):(80-90):(5-10).

In the disclosure, the biochar is modified by the ferric chloride and the mercapto silane coupling agent simultaneously, the ferric chloride and the mercapto silane coupling agent can modify the biochar to improve the adsorption capacity and the retention capacity of the biochar, the different action mechanisms of the ferric chloride and the mercapto silane coupling agent have a certain synergistic effect, which can further improve the adsorption capacity of the biochar for the heavy metal ions.

Beneficial effects of the disclosure are as follows.

(1) The carbon fixation material for adsorbing heavy metals in soil provided by the disclosure is prepared by compounding the modified biochar, the calcium silicate, the aluminum sulfate, the hydroxymethyl cellulose and the urea, which has an excellent carbon fixation capacity. Moreover, the biochar is prepared by processing the agricultural and forestry waste, the material source (i.e., the agricultural and forestry waste) is green and environmentally friendly, which can reduce environmental pollution. After modified by the ferric chloride and the mercapto silane coupling agent, the modified biochar has excellent adsorption amount and adsorption capacity for the heavy metal ions and a strong retention capacity after adsorption, and the modified biochar can be widely used in the fields of soil carbon fixation and heavy metal pollution treatment.

(2) The carbon fixation material for adsorbing heavy metals in soil provided by the disclosure is prepared by compounding the modified biochar, the calcium silicate, the aluminum sulfate, the hydroxymethyl cellulose and the urea. The gelatinous substance formed by the calcium silicate and the aluminum sulfate can form an agglomerate with the soil, and the agglomerate has extreme adsorption capacity, and can improve carbon capture capacity of the soil. The hydroxymethyl cellulose and the urea can form a film to fix the captured carbon in the soil, to thereby achieve the carbon fixation effect of the soil.

(3) In the carbon fixation material for adsorbing heavy metals in soil provided by the disclosure, the biochar is prepared by processing the agricultural and forestry waste, so as to achieve reuse of the wastes, and reduce environmental pollution and resource wastes. The biochar is further pretreated with the ferric chloride and acid, on the one hand, a large amount of micropores may appear on a surface of the biochar, which effectively increase a specific surface of the biochar, thereby enhancing the adsorption amount and adsorption capacity of the biochar; on the other hand, the biochar can be loaded with iron elements, and the adsorption capacity of the biochar for the heavy metal ions is further improved through an ion exchange effect of the iron elements.

(4) In the carbon fixation material for adsorbing heavy metals in soil provided by the disclosure, the thiolation the reaction is performed on chloromethylphenethyltris(trimethylsiloxy)silane to obtain the mercapto silane coupling agent. The sulfhydryl in the mercapto silane coupling agent reacts with the pretreated biochar, so that the mercapto silane coupling agent is successfully grafted into the biochar structure. The prepared mercapto silane coupling agent is non-toxic and harmless, and is grafted into the biochar structure. On the one hand, a large amount of silicon oxygen structures and silane structures in the mercapto silane coupling agent have good adsorption capacity for the heavy metal ions, which can further improve the adsorption capacity of the biochar for the heavy metal ions. On the other hand, the stable spatial structure of benzene ring and multi-branched chain of the mercapto silane coupling agent has excellent stability, which can improve the retention capacity of the biochar after adsorbing the heavy metals, thereby improving the treatment effect of the heavy metal ions.

(5) In the carbon fixation material for adsorbing heavy metals in soil provided by the disclosure, the biochar is modified by the ferric chloride and the mercapto silane coupling agent simultaneously, the ferric chloride and the mercapto silane coupling agent can modify the biochar to improve the adsorption capacity and the retention capacity of the biochar, the different action mechanisms of the ferric chloride and the mercapto silane coupling agent have a certain synergistic effect, which can further improve the adsorption capacity of the biochar for the heavy metal ions.

DETAILED DESCRIPTION OF EMBODIMENTS

The disclosure will be described below in conjunction with embodiments. It should be noted that the following embodiments are examples of the disclosure, which are merely used to describe the disclosure, are not used to limit the disclosure. Other combinations and various modifications within a concept of the disclosure may be performed without departing from a spirit or scope of the disclosure.

The commercially available biochar adsorbent is Huafeng straw biochar purchased from Jiangsu Huafeng Agricultural Bioengineering Co., Ltd., and the Huafeng straw biochar is black powder with a particle size of 80 mesh. The remaining reagents and devices are conventional reagents and devices in the technical field.

The preparation of mercapto silane coupling agent-1 is as follows.

3 grams (g) thiourea and 15 g chloromethylphenethyltris(trimethylsiloxy)silane are added into a three-necked flask equipped with a condenser, a stirrer and a thermometer to obtain a mixture. The mixture is heated to 180° C. to reflux for 8 h, and then the mixture is cooled to 85° C. Ammonia gas is continuously introduced into the three-necked flask until no reaction occurs to obtain a reacted mixture. The reacted mixture is filtered to obtain a filtrate. The filtrated is decompressed and distilled to obtain a fraction at a temperature range of 190° C. to 200° C. The fraction at the temperature range of 190° C. to 200° C. is the mercapto silane coupling agent-1.

Mass spectrometry data of the mercapto silane coupling agent-1 is as follows: the product (i.e., the mercapto silane coupling agent-1) is analyzed by using a liquid chromatography-mass spectrometry (LC-MS), and mass-to-charge (m/z) values of the product are 446.16 (100.0%), 447.28 (45.4%), 448.21 (23.9%), 449.27 (7.0%), and 450.22 (2.0%).

The preparation of mercapto silane coupling agent-2 is as follows.

The preparation of the mercapto silane coupling agent-2 is basically the same as the preparation of the mercapto silane coupling agent-1, except that the chloromethylphenethyltris(trimethylsiloxy)silane is replaced by an equal amount of ((chloromethyl)phenylethyl)trimethoxysilane ($C_{12}H_{19}ClO_3Si$).

Embodiment 1

A carbon fixation material for adsorbing heavy metals in soil is prepared by the following steps 1-4.

In step 1, corn straw is washed with distilled water to remove impurity to obtain washed corn straw. The washed corn straw is pyrolyzed at a temperature of 500° C. in a closed environment for 3 h to obtain a pyrolyzed product. The pyrolyzed product is ground until a particle size of the pyrolyzed product is smaller than 1.5 mm, to thereby obtain biochar.

In step 2, 10 g biochar is added into 300 mL ferric chloride solution with a concentration of 0.2 mol/L for ultrasonicating for 50 min to obtain a first mixture. A pH of the first mixture is adjusted to 2, and then the first mixture with the pH of 2 is stirred for 4 h to obtain a stirred mixture. The stirred mixture is filtered, washed and dried sequentially to obtain pretreated biochar.

In step 3, the pretreated biochar, the mercapto silane coupling agent-1, ethanol and deionized water are added into a reactor to obtain a second mixture. The second mixture is stirred to react for 6 h to obtain a first reacted mixture. A pH of the first reacted mixture is adjusted to 8. Then the first reacted mixture with the pH of 8 is continuously stirred to react for 8 h to obtain a second reacted mixture. the second reacted mixture is filtered, washed and dried to obtain a solid mixture. The solid mixture is ground until a particle size of the solid mixture is smaller than 1.5 mm, to thereby obtain modified biochar.

In step 4, 50 parts of the modified biochar, 15 parts of calcium silicate, 5 parts of aluminum sulfate, 3 parts of hydroxymethyl cellulose and 5 parts of urea are mixed evenly in proportion to obtain the carbon fixation material for adsorbing heavy metals in soil.

In the step 3, a weight ratio of the pretreated biochar:the mercapto silane coupling agent-1:the ethanol:the deionized water is 5:2:90:10.

Embodiment 2

The embodiment 2 is basically the same as the embodiment 1, except that in the step 3, a weight ratio of the pretreated biochar:the mercapto silane coupling agent-1:the ethanol:the deionized water is 5:1:90:10.

Embodiment 3

The embodiment 3 is basically the same as the embodiment 1, except that in the step 3, a weight ratio of the pretreated biochar:the mercapto silane coupling agent-1:the ethanol:the deionized water is 3:2:90:10.

Comparative Embodiment 1

The comparative embodiment 1 is basically the same as the embodiment 1, except that the steps 1-3 are not performed, and in the step 4, the modified biochar is replaced with an equal amount of commercially available biochar adsorbent.

Comparative Embodiment 2

The comparative embodiment 2 is basically the same as the embodiment 1, except that in the step 2, the ferric chloride solution is replaced with an equal amount of deionized water.

Comparative Embodiment 3

The comparative embodiment 3 is basically the same as the embodiment 1, except that in the step 3, the mercapto silane coupling agent-1 is replaced with an equal amount of deionized water.

Comparative Embodiment 4

The comparative embodiment 4 is basically the same as the embodiment 1, except that in the step 3, the mercapto silane coupling agent-1 is replaced with an equal amount of mercapto silane coupling agent-2.

Comparative Embodiment 5

The comparative embodiment 5 is basically the same as the embodiment 1, except that in the step 3, the mercapto silane coupling agent-1 is replaced with an equal amount of (3-mercaptopropyl) trimethoxysilane ($C_6H_{16}O_3SSi$).

Performance Testing

Detections of adsorption capacity and adsorption amount: 0.1 g of each product (i.e., the carbon fixation material) of the embodiments 1-3 and the comparative embodiments 1-5 is weighed and placed in a 500 mL wide-mouth conical flask as a simple. Each sample is added with 100 milligrams per liter (mg/L) cadmium ion ($Cd^{2+}$) solution. Each wide-mouth conical flask added with the sample and the $Cd^{2+}$ solution is placed in a double-layer constant temperature shaker with a temperature range of 20° C. to 30° C. The double-layer constant temperature shaker is oscillated at a speed of 150 rotations per minute (r/min) for 12 h to obtain oscillated mixtures. Each oscillated mixture is filtered with a 0.45 microns (μm) micropore filtering film to obtain a filtrate. $Cd^{2+}$ in each filtrate is tested by using a flame atomic absorption spectrophotometer, and a maximum adsorption amount and adsorption rate of each product for $Cd^{2+}$ in the $Cd^{2+}$ solution are calculated.

Detection of retention capacity: Each filtrate is oscillated at a speed of 250 r/min for 1440 min. The oscillated filtrates are placed in a centrifuge with a centrifugal radius of 13.50 centimeters (cm) and centrifuged with a speed of 4000 r/min for 5 min. $Cd^{2+}$ in the centrifuged filtrates is tested by using the flame atomic absorption spectrophotometer, and the change in the adsorption rate of $Cd^{2+}$ is calculated as the product desorption amount.

Detection results are as following table.

| | Adsorption rate (%) | Maximum adsorption amount (milligrams per gram abbreviated as mg/g) | Desorption amount (%) |
|---|---|---|---|
| Embodiment 1 | 99.1 | 342 | 1.3 |
| Embodiment 2 | 98.7 | 340 | 1.5 |
| Embodiment 3 | 99.2 | 341 | 1.2 |
| Comparative embodiment 1 | 73.4 | 216 | 8.6 |
| Comparative embodiment 2 | 84.6 | 294 | 3.7 |
| Comparative embodiment 3 | 81.3 | 302 | 5.8 |
| Comparative embodiment 4 | 94.5 | 324 | 2.6 |
| Comparative embodiment 5 | 91.8 | 311 | 3.2 |

It can be seen from the detection results of the embodiments 1-3 and the comparative embodiment 1 that compared to the biochar adsorption material in the related art, the modified biochar in the carbon fixation material provided by the disclosure has more excellent adsorption capacity and greater adsorption amount, and has strong retention capacity after adsorption, so that the modified biochar can be widely applied to the treatment of heavy metal pollution in soil.

It can be seen from the detection results of the embodiments 1-3 and the comparative embodiments 2-3 that after the biochar is modified by the ferric chloride and the mercapto silane coupling agent, the modified biochar in the carbon fixation material provided by the disclosure has excellent adsorption amount and adsorption capacity for the heavy metal ions, and has strong retention capacity after adsorption. Meanwhile, the adsorption capacity of the biochar can be further improved through the synergistic effect of the ferric chloride and the mercapto silane coupling agent.

It can be seen from the detection results of the embodiments 1-3 and the comparative embodiments 4-5 that the modified biochar in the carbon fixation material provided by the disclosure grafts the mercapto silane coupling agent into the biochar structure, which not only improves the adsorption capacity of the biochar for the heavy metal ions, but also improves the retention capacity of the biochar after adsorption.

Detections of the soil carbon fixation capacity and the heavy metal adsorption capacity are as follows: tomato fields each with an area of 1 mu are selected, experimental groups are added with 20 kilograms per 667 square meters (kg/667 m²) of the products of the embodiments 1-3 and the comparative embodiments 1-5 respectively when sowing tomatoes, and the control group are not added with the products. Each group is managed by using the same water and fertilizer, statistics are taken after the tomato harvest. Parallel experiments are set up, and removal rates of $Cd^{2+}$ of different products are tested at the same time.

The detection results are as following table.

| | Carbon fixation amount (ton per square hectare per year abbreviated as t/hm²/a) | Yield (kg/667 m²) | Removal rate of $Cd^{2+}$ (%) |
|---|---|---|---|
| Embodiment 1 | 26 | 6215 | 96 |
| Embodiment 2 | 26 | 6210 | 95 |
| Embodiment 3 | 27 | 6220 | 96 |
| Comparative embodiment 1 | 20 | 5850 | 68 |
| Comparative embodiment 2 | 23 | 6080 | 80 |
| Comparative embodiment 3 | 21 | 5950 | 77 |
| Comparative embodiment 4 | 24 | 6115 | 89 |
| Comparative embodiment 5 | 24 | 6100 | 85 |
| Control group | 3 | 5300 | — |

It can be seen from the detection results of the embodiments 1-3 and the control group that the carbon fixation material for adsorbing heavy metals in soil provided by the disclosure has excellent carbon fixation capacity, can increase crop yields, has excellent adsorption capacity for heavy metals in soil, and can treat soil heavy metal pollution.

It can be seen from the detection results of the embodiments 1-3 and the comparative embodiments 1-5 that the carbon fixation material for adsorbing heavy metals in soil provided by the disclosure can effectively improve the carbon fixation capacity of the material and the organic carbon content in the soil through compounding the modified biochar, the calcium silicate, the aluminum sulfate, the hydroxymethyl cellulose and the urea, so as to improve the crop yields. Meanwhile, the carbon fixation material for adsorbing heavy metals in soil provided by the disclosure has excellent adsorption capacity for heavy metals in soil, and can treat soil heavy metal pollution.

The above embodiments are merely for illustrating the technical concept and features of the disclosure, and the purpose is to enable those skilled in the art to understand the content of the disclosure and implement the disclosure, and the above embodiments cannot be used to limit a scope of protection of the disclosure. Any equivalent changes or amendments made according to the spirit of the disclosure should be included in the scope of protection of the disclosure.

What is claimed is:

1. A preparation method of a carbon fixation material for adsorbing heavy metals in soil, comprising:
   step 1, processing agricultural and forestry waste to obtain biochar;
   step 2, pretreating the biochar with ferric chloride to obtain pretreated biochar;
   step 3, reacting a mercapto silane coupling agent with the pretreated biochar to obtain modified biochar; and
   step 4, mixing the modified biochar, calcium silicate, aluminum sulfate, hydroxymethyl cellulose and urea evenly in proportion to obtain the carbon fixation material for adsorbing heavy metals in soil;
   wherein a specific method of the step 1 comprises: washing the agricultural and forestry waste with distilled water to remove impurity to obtain washed waste, pyrolyzing the washed waste at a temperature range of 450° C. to 500° C. in a closed environment for 2-3 h to obtain pyrolyzed waste, and grinding the pyrolyzed waste until a particle size of the pyrolyzed waste is smaller than 1.5 mm, to thereby obtain the biochar;
   wherein a specific method of the step 2 comprises: adding the biochar into a ferric chloride solution for ultrasonicating for 30-50 min to obtain a first mixture, adjusting a power of hydrogen (pH) of the first mixture to 2-3, stirring the first mixture with the pH of 2-3 for 2-4 h, followed by filtering, washing and drying to obtain the pretreated biochar; and
   wherein a specific method of the step 3 comprises: adding the pretreated biochar, the mercapto silane coupling agent, ethanol and deionized water into a first reactor to obtain a third mixture, stirring the third mixture to react for 6-8 h to obtain a first reacted mixture, adjusting a pH of the first reacted mixture to 7-9, continuously stirring the first reacted mixture with the pH of 7-9 to react for 6-8 h, followed by filtering, washing, drying to obtain a solid mixture, and grinding the solid mixture until a particle size of the solid mixture is smaller than 1.5 mm, to thereby obtain the modified biochar;
   wherein the carbon fixation material for adsorbing heavy metals in soil comprises the following materials in parts by weight:
   40-50 parts of the modified biochar, 10-15 parts of the calcium silicate, 5-8 parts of the aluminum sulfate, 1-3 parts of the hydroxymethyl cellulose and 3-5 parts of the urea;
   wherein the mercapto silane coupling agent comprises a structure represented by a formula A expressed as follows:

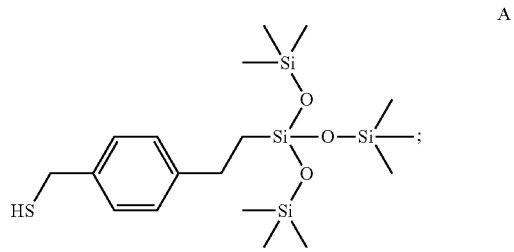

wherein the mercapto silane coupling agent is prepared by the following steps:
   adding thiourea and chloromethylphenethyltris(trimethylsiloxy)silane into a second reactor to obtain a second mixture, heating the second mixture to a temperature range of 160° C. to 180° C. to obtain a heated mixture, performing reflux reaction on the heated mixture for 6-8 h to obtain a refluxed mixture, cooling the refluxed mixture to a temperature range of 80° C. to 90° C., and continuously introducing ammonia gas into the second reactor until no reaction occurs to obtain a second reacted mixture, filtering the second reacted mixture to obtain a filtrate, decompressing and distilling the filtrate to obtain a fraction at a temperature range of 190° C. to 200° C.; wherein the fraction at the temperature range of 190° C. to 200° C. is the mercapto silane coupling agent.

2. The preparation method of the carbon fixation material for adsorbing heavy metals in soil as claimed in claim 1, wherein in the step 2, a weight ratio of the biochar to the ferric chloride is 1-2:1; and a concentration of the ferric chloride solution is in a range of 0.1 mol/L to 0.3 mol/L.

3. The preparation method of the carbon fixation material for adsorbing heavy metals in soil as claimed in claim 1, wherein in the step 3, a weight ratio of the pretreated biochar:the mercapto silane coupling agent:the ethanol:the deionized water is (3-5):(1-2):(80-90):(5-10).

4. The preparation method of the carbon fixation material for adsorbing heavy metals in soil as claimed in claim 1, wherein a weight ratio of the thiourea to chloromethylphenethyltris(trimethylsiloxy)silane is 1:4-6.

5. The preparation method of the carbon fixation material for adsorbing heavy metals in soil as claimed in claim 1, wherein the agricultural and forestry waste is at least one selected from the group consisting of corn stalks, rice husks, barks and leaves.

* * * * *